US011349989B2

(12) United States Patent
Murali et al.

(10) Patent No.: US 11,349,989 B2
(45) Date of Patent: May 31, 2022

(54) SYSTEMS AND METHODS FOR SENSING EMOTION IN VOICE SIGNALS AND DYNAMICALLY CHANGING SUGGESTIONS IN A CALL CENTER

(71) Applicant: Genpact Luxembourg S.à r.l, Luxembourg (LU)

(72) Inventors: Kashyap Coimbatore Murali, Princeton, NJ (US); Kaushik Bhaskar, Los Altos Hills, CA (US)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 19 days.

(21) Appl. No.: 16/291,740

(22) Filed: Mar. 4, 2019

(65) Prior Publication Data

US 2020/0092419 A1 Mar. 19, 2020

Related U.S. Application Data

(60) Provisional application No. 62/733,193, filed on Sep. 19, 2018.

(51) Int. Cl.
| | |
|---|---|
| *G10L 15/16* | (2006.01) |
| *G10L 15/22* | (2006.01) |
| *G10L 25/24* | (2013.01) |
| *G10L 25/63* | (2013.01) |
| *H04M 3/51* | (2006.01) |
| *G10L 17/26* | (2013.01) |
| *G06N 20/00* | (2019.01) |
| *G10L 15/02* | (2006.01) |

(52) U.S. Cl.
CPC ......... *H04M 3/5175* (2013.01); *G06N 20/00* (2019.01); *G10L 15/02* (2013.01); *G10L 17/26* (2013.01); *G10L 25/24* (2013.01)

(58) Field of Classification Search
CPC ......... G10L 15/16; G10L 15/22; G10L 25/48; G10L 25/63; G10L 25/24; H04M 3/493; H04M 3/4933; H04M 3/5166; G06N 20/00
USPC ................... 704/231, 232, 270, 270.1, 275; 379/265.06, 265.07, 266.07, 266.08
See application file for complete search history.

(56) References Cited

U.S. PATENT DOCUMENTS

| | | | |
|---|---|---|---|
| 9,521,258 B2 | 12/2016 | Ripa et al. | |
| 10,192,569 B1* | 1/2019 | Indyk | G10L 25/48 |
| 10,332,505 B2* | 6/2019 | Zoller | G10L 15/26 |
| 10,832,001 B2* | 11/2020 | Dadachev | G06F 40/284 |
| 2004/0062364 A1* | 4/2004 | Dezonno | H04M 3/523 |
| | | | 379/88.14 |
| 2007/0162283 A1* | 7/2007 | Petrushin | G10L 17/26 |
| | | | 704/255 |
| 2011/0178803 A1 | 7/2011 | Petrushin | |

(Continued)

*Primary Examiner* — Martin Lerner
(74) *Attorney, Agent, or Firm* — Goodwin Procter LLP

(57) ABSTRACT

Systems and methods for sensing emotion in voice signals and dynamically changing suggestions in a call center are disclosed. According to one embodiment, a computer-implemented method comprises receiving a call from a customer at a call center. A sample of the call is recorded and the Mel-Frequency Cepstral coefficient is extracted from the sample. A machine learning model predicts an emotion of the customer and generates a confidence score for the emotion. A script of a call center agent is modified based on the emotion and the confidence score.

20 Claims, 5 Drawing Sheets

(56) References Cited

U.S. PATENT DOCUMENTS

| | | | |
|---|---|---|---|
| 2014/0044246 A1* | 2/2014 | Klemm | H04M 3/523 |
| | | | 379/93.01 |
| 2014/0052448 A1* | 2/2014 | Krishnan | G10L 15/24 |
| | | | 704/270 |
| 2014/0114655 A1* | 4/2014 | Kalinli-Akbacak | G10L 25/63 |
| | | | 704/231 |
| 2014/0152816 A1* | 6/2014 | Pratt | G10L 15/26 |
| | | | 704/235 |
| 2015/0213800 A1* | 7/2015 | Krishnan | G10L 25/63 |
| | | | 704/246 |
| 2016/0328316 A1* | 11/2016 | Balsavias | G06F 11/3692 |
| 2018/0260873 A1* | 9/2018 | Chandramouli | G06Q 30/0625 |
| 2018/0308487 A1* | 10/2018 | Goel | G10L 15/26 |
| 2019/0013017 A1* | 1/2019 | Kang | G06F 40/35 |
| 2019/0074028 A1* | 3/2019 | Howard | G10L 25/63 |
| 2019/0171513 A1* | 6/2019 | Purushothaman | G06F 11/0748 |
| 2019/0221225 A1* | 7/2019 | Bricklin | G10L 15/26 |
| 2019/0253558 A1* | 8/2019 | Haukioja | G10L 15/22 |

* cited by examiner

SYSTEMS AND METHODS FOR SENSING EMOTION IN VOICE SIGNALS AND DYNAMICALLY CHANGING SUGGESTIONS IN A CALL CENTER

RELATED APPLICATIONS

This application claims priority to U.S. provisional patent application 62/733,193, filed Sep. 19, 2018, entitled "SYSTEMS AND METHODS FOR SENSING EMOTION IN VOICE SIGNALS AND DYNAMICALLY CHANGING SUGGESTIONS IN A CALL CENTER," the entire disclosure, which is hereby incorporated by reference.

FIELD

The present disclosure relates in general to the field of computer software and systems, and in particular, to systems and methods for sensing emotion in voice signals and dynamically changing suggestions in a call center.

BACKGROUND

Providing quality customer service is increasingly important in today's competitive business environment. Product and service providers need to maintain their existing customers while constantly seeking to acquire new ones. Although the adoption of self-service channels such as Interactive Voice Response (IVR) systems and the Internet is increasing, it by no means replaces human customer service agents.

Although self-service channels provide consistent service to customers, service provided by humans is very subjective and is therefore suitable for providing quick, real-time responses and quickly adapts to specific customer needs. A customer's overall satisfaction with a customer service agent often depends on factors such as the agent's interpersonal skills, mood, and personality.

Another method of enhancing the agent-customer telephone interaction includes providing real-time dialog assistance to a call center agent by recognizing certain phrases and suggesting a different response phrase.

Emotion related data can provide useful information about a person's overall wellness and mood. During a call agent's conversation with a customer, the customer may become frustrated, annoyed, angry and/or confrontational. At first, these emotions may not be present in the customer's voice. Prior systems have been unable to detect and modify the scripts used in call centers based on the emotions exhibited by the customer.

SUMMARY

Systems and methods for sensing emotion in voice signals and dynamically changing suggestions in a call center are disclosed. According to one embodiment, a computer-implemented method comprises receiving a call from a customer at a call center. A sample of the call is recorded and the Mel-Frequency Cepstral coefficient is extracted from the sample. A machine learning model predicts an emotion of the customer and generates a confidence score for the emotion. A script of a call center agent is modified based on the emotion and the confidence score.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
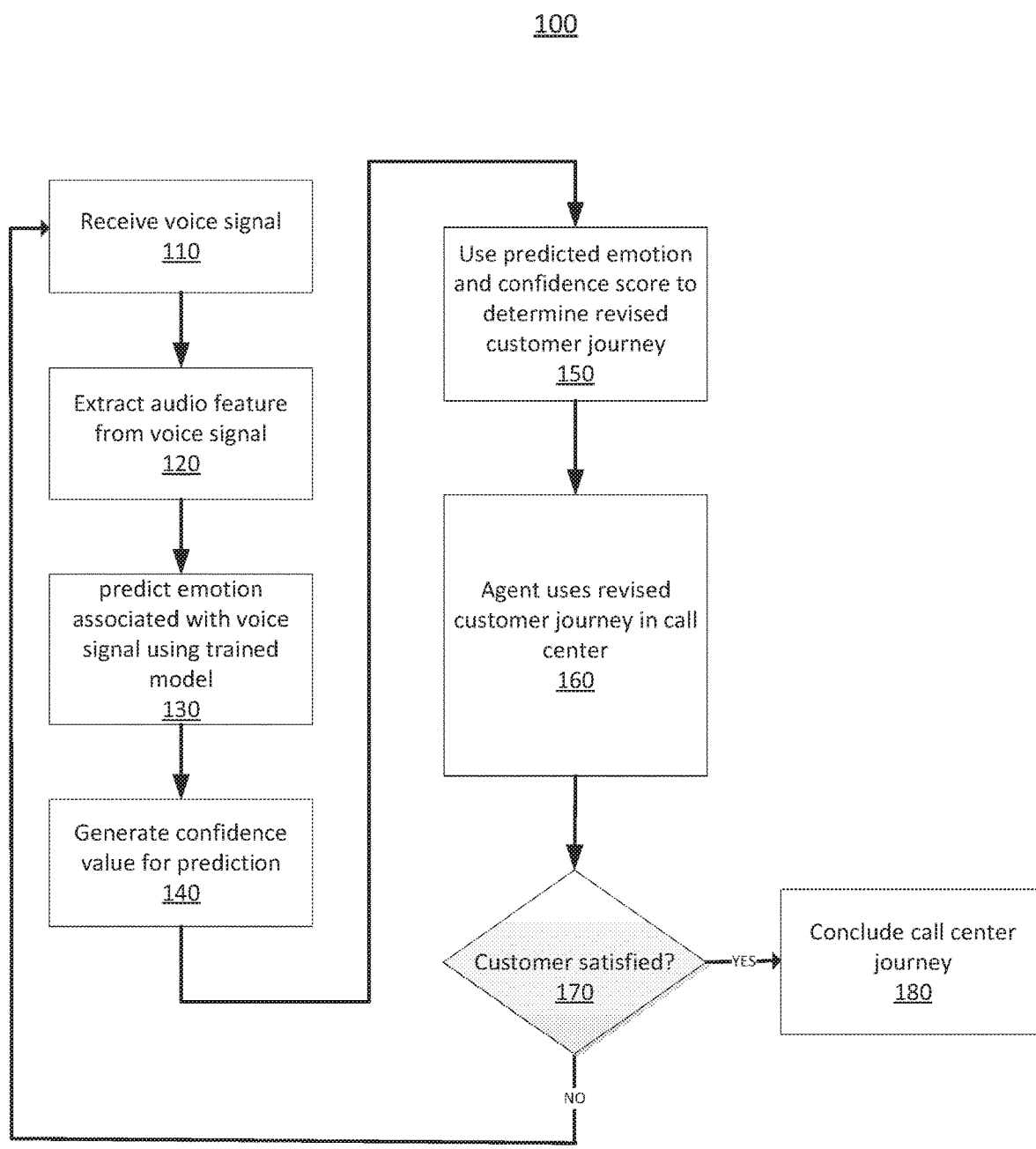
FIG. 1 depicts a flowchart of an exemplary emotion sensing process, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Systems and methods for sensing emotion in voice signals and dynamically changing suggestions in a call center are disclosed. According to one embodiment, a computer-implemented method comprises receiving a call from a customer at a call center. A sample of the call is recorded and the Mel-Frequency Cepstral coefficient is extracted from the sample. A machine learning model predicts an emotion of the customer and generates a confidence score for the emotion. A script of a call center agent is modified based on the emotion and the confidence score.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system and method relates to voice sensing and optimizing a customer's experience. In particular, sensing emotion using statistics calculated for voice signal parameters, and dynamically changing the suggested path to convergence based on the extracted emotion.

Prior voice sensing systems do not address the problem of making changes to a standard operating procedure ("SOP") by predicting customers' interests and enabling the call center agent to take a risk and optimize the SOP. The present system provides an advantage of improving customer experience based on real time analysis. Risks of potentially lowering the customer experience are mitigated because the customer typically asks a more specific question, which then allows the present system to be a faster and more efficient system for customers and customer service agents alike. By analyzing voice signals instead of transcribing the audio file using a Speech-To-Text engine and performing text analytics, sarcasm and other modulation changes can be taken into account in order to sense the customer better and optimize the procedure in real time. Modulation changes represent the tonality changes of the customer such as the increase in volume, grunts, and sarcasm.

A SOP may not provide the most optimal route because there are many questions that treat the customer the same no matter the emotion and reduces customer satisfaction. For example if a customer was trying to check his/her bank balance, and asks "What is my balance", the next step by a call center agent would be to ask whether the customer wants the current bank balance or that from a previous cycle. In the case that the customer was in a happy mood this would not pose too much of a problem, but in the case that the customer was angry, the present system allows the call service agent to provide the current bank balance.

According to one embodiment, a system is provided for performing various functions and activities through voice analysis, sensing and systems to change the SOP as necessary. The system may be enabled using a hardware implementation as suggested by FIG. 2.

FIG. 1 is a flowchart of an exemplary emotion sensing process 100 using voice analysis and makes suggestions of topics of speech, according to one embodiment. Emotion sensing process 100 begins when an audio (e.g., voice) signal is received (110). The audio signal is processed to extract an audio feature (120). Using the audio feature, a trained model predicts an emotion associated with the voice signal (130). The present system computes a confidence value for the prediction (140). The confidence score (probability) is determined by picking the biggest number (probability) from the input sequence over each predicted class.

Some additional processes used to generate confidence values for the prediction (140) include contextual analytics, as well as past customer experiences.

Past customer experiences are represented by the importance values determined in each call. After checking the emotions every 3 seconds and generating an importance value, the present system generates a running list of importance values for each call. The present system perform the following:

Test linear, logistic, polynomial, stepwise, ridge, lasso and ElasticNet regression in order to find which algorithm has the highest coefficient of determination, $r^2$.

After finding the algorithm has the highest coefficient of determination, apply that algorithm to past customer data to find a trend by "fitting" the trend to the data.

If the prediction is high, the threshold is set to medium as compared to the default of low.

The present system may use contextual analytics to influence the confidence score. The system may consider contextual variables such as the time the user was waiting on the phone, the relative time of the user, and the user's age. Relative time refers to the user's time zone and the military time of that area at the time the user calls. For example someone calling at 11:00 PM holds more importance than someone calling at 6:00 PM.

Using a decision tree process (e.g., regular decision trees, random forests, and XGBoost trees), the present system can produce a decision tree using one or more of the contextual variables. A decision tree is a numerical representation of the correlation between all the contextual variables and the output variable (e.g., length of the call: short, medium, or long). The decision tree sets rules where certain thresholds require certain decisions. Non-numeric variables such as countries, and likes and dislikes, can be mapped to a number using the "map" function which takes in an input value, and maps it to a given integer.

There are three decision trees that the system may use: regular decision trees, random forests, and XGBoost trees. A regular decision tree runs one iteration through the dataset, which brings about high variance and bias. To reduce the variance, multiple decision trees are clumped together in the form of a random forest, taking a "consensus" thus allowing an average. While the variance is lowered, bias still needs to be lowered. Thus XGBoost, both takes multiple trees but also tells each subsequent tree the errors made in the previous tree thus reducing bias and variance therefore increasing accuracy of the model. (XGBoost is an open-source programming library which is a framework for C++, Java, R, Python, and Julia. It runs on Linux, Windows, and macOS.)

Based on what call length is derived by the model (short, medium, long), the average call time will be changed. If short, the number calculated from the customer's emotion is subtracted by the confidence of the model as a decimal (ex: 0.56) multiplied by 3 (e.g., normalization factor based on the number of call length classes—small, medium and long). If the call length is determined to be medium with a confidence higher than 0.5, no value is subtracted. If the confidence is lower than 0.5, the confidence multiplied by 3 is subtracted. Finally, if the call length derived is long, then the confidence of the model is added to the emotion. This system enables the inclusion of contextual analytics thus improving the customer's experience by providing them personalized service.

A decision tree is an algorithm that creates a set of if/else statements based on the variables that can be evaluated and the amount of data that is available. The decision tree sets thresholds for the input variables to see if the process should go down a particular branch as it filters down the "tree." For each set of combinations for the variables, an output variable of short, medium or long can be reached. A decision tree contains multiple routes that can be taken to reach an output value. In this case the output value is the call length (short, medium, or long).

For example, consider a customer calling regarding an issue with a warranty. After training on the data, the decision tree would have a threshold value for the variables including: customer's time based on their location, age, and how long the customer is waiting on the phone. If the customer is calling at 3 AM, she waited for 5 minutes in the lobby, and she is 65 years old, the system would classify the call length to be short. Maybe for a different customer, if she is calling at 3 PM, and she only waited for 30 seconds, and she is 28 years old, the system would classify the call length to be long. These thresholds are set by the decision tree itself based on the data it has analyzed.

As described herein, there will be a group of decision trees that give an output value, and like a vote, the output value with the highest number of decision trees providing it is selected.

The present system uses the predicted emotion and confidence score to determine a revised customer journey (150). A customer journey may be a script that a call center agent follows to resolve a customer problem, when the customer calls the call center. The script may also be referred to as a standard operating procedure. The call center agent uses the revised script to address the customer problem (160). If the customer is satisfied (170), then the customer journey completes (180). If the customer is not satisfied, the system repeats emotion sensing process 100.

Figure 2:
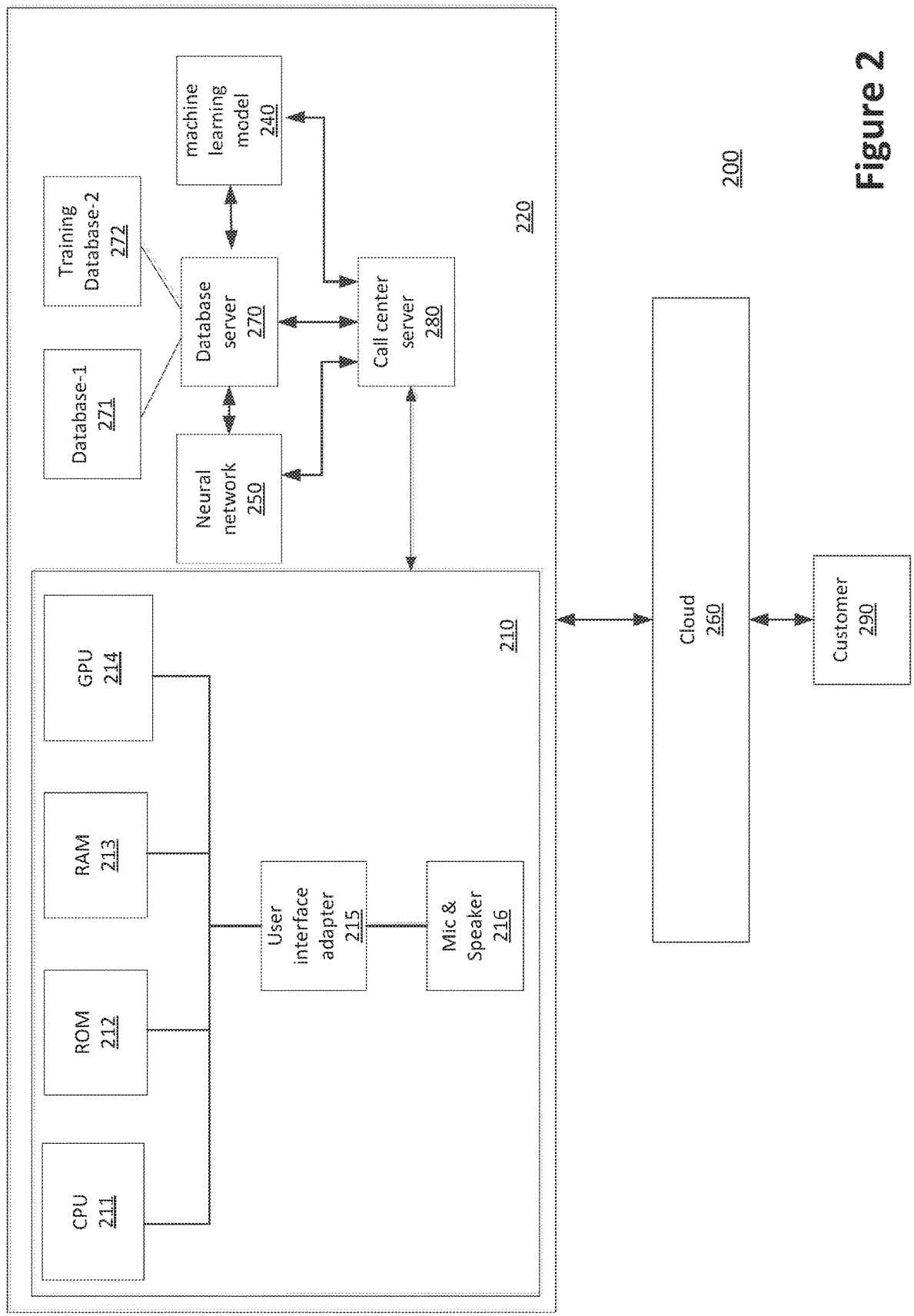
FIG. 2 is a diagram of an exemplary hardware and data structure system for sensing emotion, according to one embodiment.

FIG. 2 is a diagram of an exemplary hardware and data structure system for sensing emotion 220, according to one embodiment. System 220 includes a work station 210 having a central processing unit 211, Read Only Memory 212, and Random Access Memory 213. Graphical Processing Unit 214 may be used for advanced computations to run Artificial Intelligence solutions, such as training machine learning models 240. A user interface adapter 215 is used to connect peripherals which are useful for recording and outputting audio such as a microphone and a speaker 216, which the call center agent may use to talk to the customer. The components of work station 210 may be connected by a system bus.

A unified database 270 has two individual databases, 271 and 272. The unified database 270 may be hosted on the cloud 260 in order to enable easy access across multiple work stations. Database 272 may include training data used to train machine learning models 240. Database 271 may contain information related to the customer, the customer journey, scripts reflecting the Standard Operating Procedures for customer problems, the audio clips sampled from the customer 290, etc.

At least one audio feature is extracted from the signal (120) using call center server 280. In alternate embodiments, the audio feature is extracted and analyzed using a neural network 250 that implements the trained machine learning model 240. The audio feature (Mel Frequency Cepstral Coefficients) is extracted by performing a series of steps:

1. Frame the signal into short frames (e.g., a 4 byte frame having a ".wav" file format).
2. For each frame calculate the periodogram estimate of the power spectrum.
3. Apply the mel filterbank to the power spectra, sum the energy in each filter.
4. Take the logarithm of all filterbank energies.
5. Take the DCT of the log filterbank energies.
6. Keep DCT coefficients 2-13, discard the rest. The DCT coefficients are the final audio features that are extracted out of the audio file (.wav). DCT Coefficients 2-13 are the input to the model.

As explained above, the system 220 determines the emotion associated to the voice signal provided by customer 290 by making a prediction using a trained model 240. The prediction is determined by imposing a weight matrix on the sigmoid function which gives the probability from 0 to 1 and choosing the highest probability from all the potential output classes.

The present system uses a neural network 250 to process the voice signal using the trained model 240. The neural network 250 is composed of many "layers" which have a lot of neurons that do the computation. The input layer is the first layer which has the input and each successive layer takes information from the previous layer and does more computation.

The weight matrix is built by system 220 by computing the derivative of the data from the previous layer and adding a bias value which is then passed to the sigmoid function. The bias value is learned by the neural network. The bias value is a number which the neural network tunes. The function is w (weight matrix)*x (value from previous layer)+b (bias value that is learnt).

The sigmoid function is an activation function which is represented by the formula $$g(z) = \frac{1}{1+e^{-z}}.$$

The potential output classes are the emotions of the customer, such as angry, fearful, sad, and happy.

The model 240 may be trained based on audio files, such as those from Surrey Audio-Visual Expressed Emotion (SAVEE), saved in training database 272. The model 240 is trained by running it a number of times across the dataset to identify which weights (patterns) from the dataset gives the closest result to the actual emotion, and storing those weights for future predictions in database 272. The database 272 may consist of recordings from 4 male actors in 7 different emotions, 480 British English utterances in total.

The present system 220 outputs the predicted emotion and the model's 240 confidence in predicting the emotion. Using the predicted emotion and the confidence score, the call center server 280 determines whether a different response should be provided to the customer 290 with an appropriate risk, rather than the response that would have been provided under the SOP. The risk is calculated based on the confidence of the model's 240 prediction on a future emotion based on past emotions. Risk is calculated as 1−the probability of the future emotion. The importance of the patterns of previous emotions are learned by the neural network.

The call center agent is informed through workstation 210 of the optimal route (e.g., different/revised response from the SOP) and the call center agent provides a response that is modified from the SOP by the model 240. This is done by the call center server 280 that compares the importance of each step in the SOP to the emotion predicted and the confidence in the prediction. The system administrator provides the importance of each step as part of a scale from 1-10 and stores this information in database 271. For example in the case of a warranty issue, getting the warranty number would be of very high importance while checking if the customer is interested in a different product would be of very low interest. Using the administrator's importance from a scale of 1-10, the model 240 takes the confidence in the prediction and multiplies it by the emotion value. Emotion values are assigned as follows:

Angry=4
Sad=3
Fearful=2
Happy=1

This would give a maximum value of 4 (1*4), which would be if the model 240 is 100% confident (hence the 1) and angry (4). The administrator's score is normalized to the same scale, so whatever importance the administrator gives to a certain step, it will be divided by 2.5.

According to another embodiment, if the model 240 is 35% confident that the customer 290 was sad, and the importance of that step was 4 out of 10, the process calculates 0.35 (confidence)*3 (emotion)=1.05, and then 4 (importance)/2.5 (number to divide by)=1.6. As the customer's number ("acceptable risk") is lower than the importance of that SOP step, that step will not be replaced.

According to another embodiment, if customer 290 wanted to make an insurance claim, he makes a call to his insurance company who has an automated system that makes him dial a lot of buttons which then finally takes him to a call center agent. Customer 290 is very angry about the problem he is facing and that the insurance company rerouted him so long, that it portrays very clearly in his voice. The present system 220 is running and records his voice and performs analysis on it. It is very confident (95%) in its prediction that the customer is very angry. As part of the Standard Operating Procedure, the call center agent has to ask whether or not he is interested in other insurance plans, and better offers. While defining the SOP earlier, the administrator assigns an importance of 3 out of 10 to this step. The identified emotion anger is assigned an emotion value of 4, the confidence (probability) can be represented as 0.95 (95%=0.95), and the value that the importance of the step is divided by 2.5 resulting in 1.25(3/2.5).

The confidence is then multiplied by the emotion value then compared to the importance value which is divided by 2.5. From data from the customer:

(confidence of model) * (emotion value)

$0.95 * 4 = 3.8$

From importance of the step:

$3/2.5 = 1.2$

As 3.8>1.2, the step of asking whether the customer is interested in other insurance plans is skipped. This process is repeated over and over again across the duration of the call. If an emotion value is greater than importance, that step of the SOP is modified or removed. If emotion value is less than importance, keep the SOP step.

Database 270 used by model 240 works well as compared to a SQL Database because it offers up to 7× faster load speeds. This is derived from the fact that it approximately takes 24 hours to load 1 Terabyte from SQL while it takes only 3.5 hours to load the same in this native data structure (e.g., comma separated values). Faster speeds allow the system to optimize the SOP faster as compared to using other data structures. The present data structure has 217 columns where the first one is the index, then 215 columns are the 215 audio features extracted from the 3 second clip then the last column is the label of the dataset. This is different from a regular SQL database as this is stored in local memory which does not need to be loaded on as compared to a regular SQL database. The present data structure is also integrated into the Python language which allows for faster call speeds as compared to using external tools to connect to an SQL database.

Figure 3:
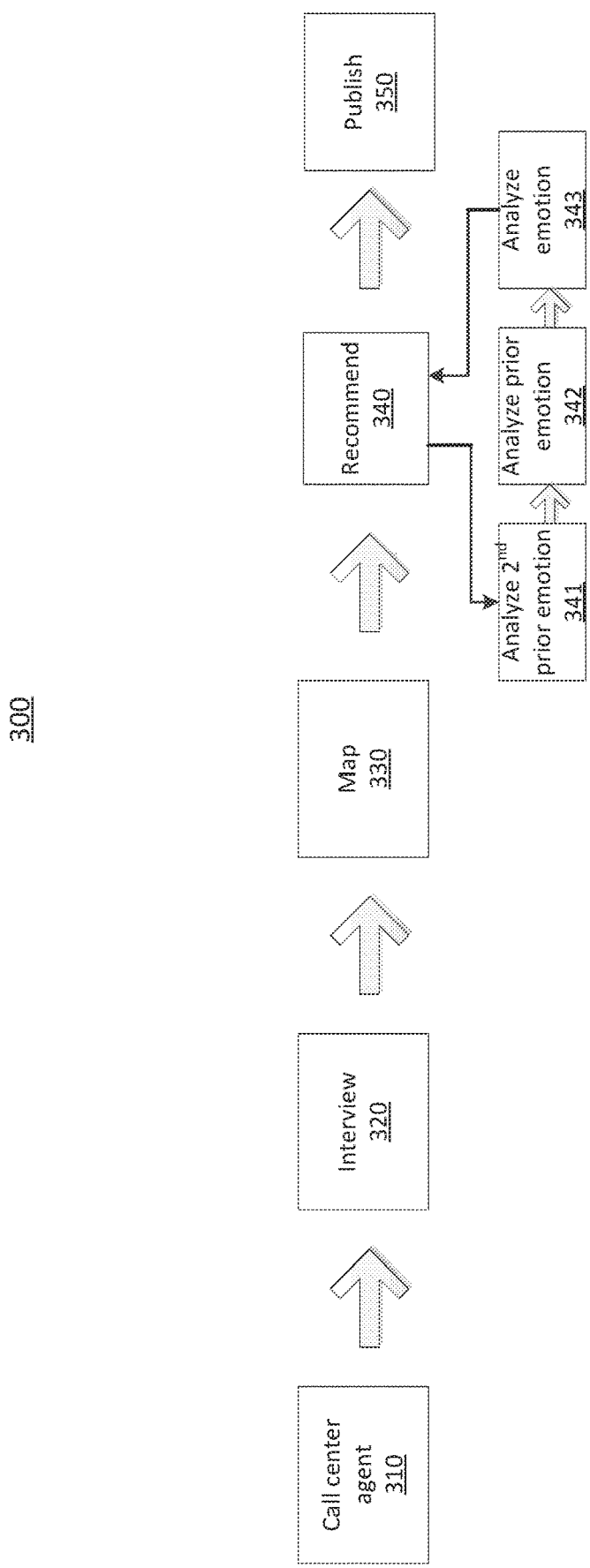
FIG. 3 is an exemplary call center process, according to one embodiment.

FIG. 3 is an exemplary call center process 300, according to one embodiment. Call center process 300 reflects a customer journey as described above. A call center agent picks up a call from a customer (310). As the call proceeds and the customer explains her problem to the call center agent during the interview (320), and the emotion of the customer is mapped to an emotion (330). This is done by the call center server 280 that preprocesses a 3 second long audio clip to extract the audio features and then passes it to a model 240 running on a neural network 250 to predict an emotion. During a call, the customer is recorded in 3 second clips every 3 seconds. If the customer is angry with how long the process is taking, the model identifies the emotion of anger based on the recorded clips. The system 220 may then make the process shorter. The system 220 can be used in other scenarios based on other emotions, such as if the customer was sad, happy or fearful.

After mapping the emotion of the customer to a particular emotion, call center server 280 recommends a revised script (revised standard operating procedure) (340) by analyzing multiple time steps including two emotions before (341), one emotion before (342) and the current emotion (343) in order to generate changes to the script of the SOP. Two timesteps before represents 12 seconds before as audio is recorded in 3 second clips every 3 seconds. Each timestep has a prediction for the emotion, and analyzing a sequence of emotions can give insights on how the customer's emotion is getting better or worse and what his/her emotion could be in the future. With this information, the system can make changes to the script used by the call center agent. As the revised route is generated, it is then published (350) to the call center agent, which represents the full flow of the customer journey.

Figure 4:
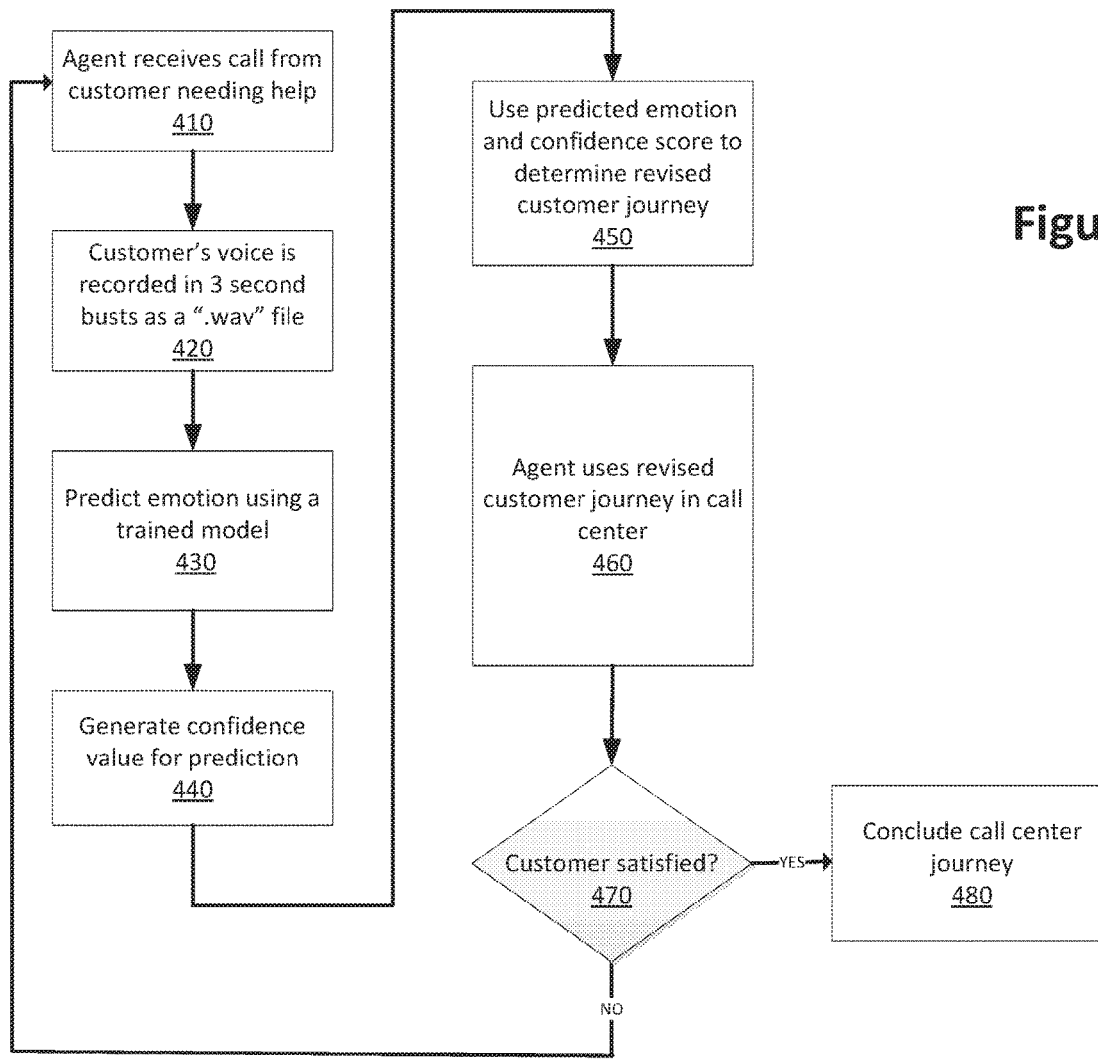
FIG. 4 is an exemplary call center process, according to one embodiment.

FIG. 4 is an exemplary call center process 400, according to one embodiment. A call center agent receives a call from a customer with a problem or needing help (410). The Mel-Frequency Cepstral coefficient is extracted after recording a few (e.g., three) seconds of customer audio (420). The Mel-Frequency Cepstral Coefficient (MFCC) is the audio feature that is extracted to make a prediction on. To summarize, the audio file is not passed directly to the model to make a prediction, but features (e.g., MFCC) are extracted for the model to make a prediction.

A trained model makes a prediction using the extracted feature (430), which is then outputted along with the probability of the highest probable class as the score (440). Next, the emotion and the confidence (score) are both taken into consideration in order to analyze how much risk to take and accordingly how much of the Standard Operating Procedure must be cut or modified (450). The optimized/updated SOP is outputted to the call center agent who then implements the updated SOP (460) and improves customer experience. If the customer is satisfied (470), then the customer journey completes (480). In case the call continues, the process 400 can be repeated as necessary in order to satisfy the customer.

Figure 5:
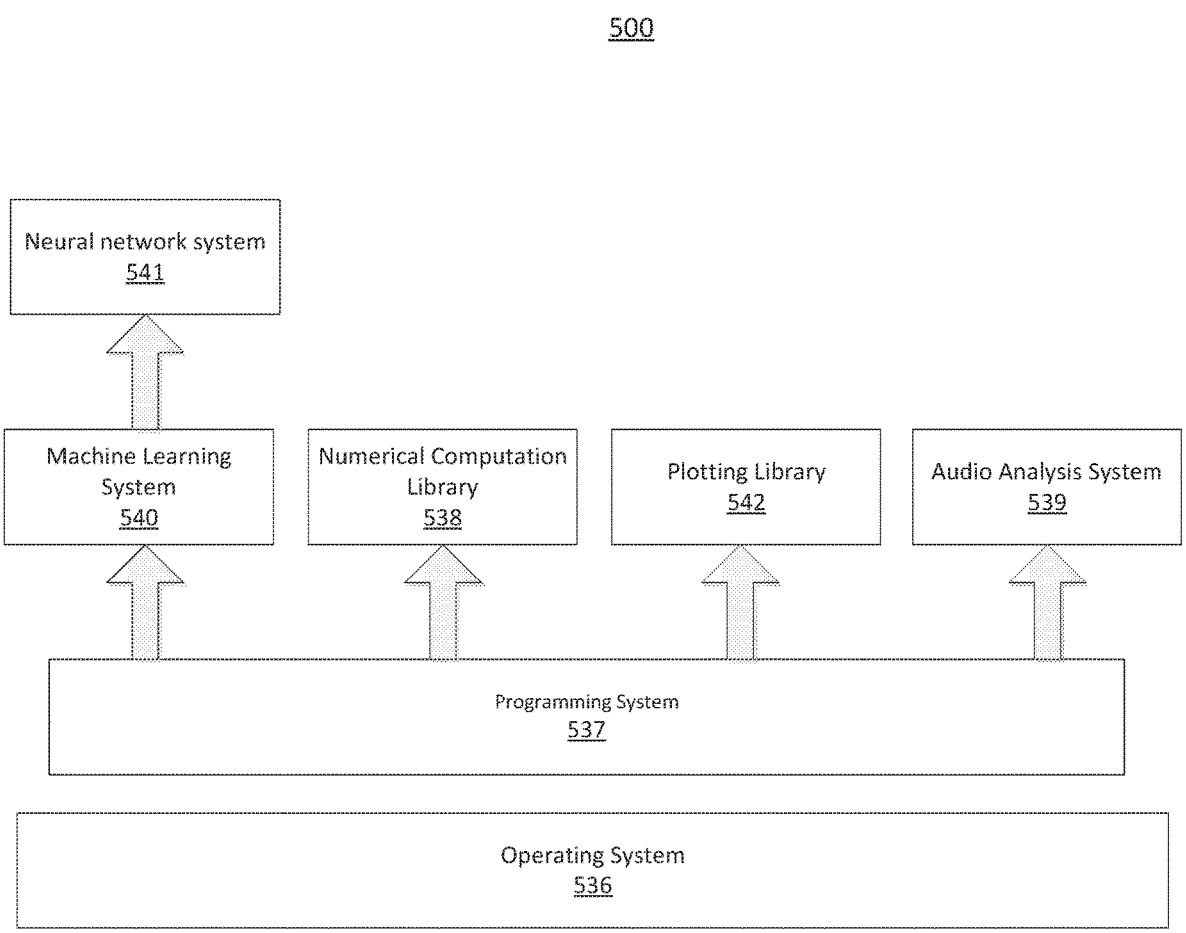
FIG. 5 is an exemplary software architecture for a sensing emotion system, according to one embodiment.

FIG. 5 is an exemplary software architecture for a sensing emotion system 500, according to one embodiment. An operating system 536 is where the tools and technologies listed above can run. This can be any operating system 536 such as MacOS, Linux or Windows. According to one embodiment, the present system uses Python as the programming language system 537. In order to perform various matrix operations such as fitting all the frames of audio into the waveform, a numerical computation library 538 is used. The numerical computation library 538 performs the matrix operations for processing the waveform of interest. An audio analysis library 539 (e.g., Librosa) extracts the key features within audio files by using the Mel Frequency Cepstral Coefficient. The audio analysis library system 539 extracts features (120 in FIG. 1). These features are then fed into the machine learning system 540 in order to make a prediction.

The present system 500 performs the machine learning operations using machine learning system 540 (e.g., Tensorflow) which is a machine learning framework for high performance numerical computation. Machine learning system 540 has a flexible architecture that can work with platforms such as Central Processing Units (CPUs), Graphical Processing Units (GPUs), and Tensor Processing Units (TPUs).

According to one embodiment, the present system 500 uses a high-level neural network API 541 (e.g., Keras) that runs on top of the machine learning system 540. The present system 500 uses data visualization and plotting library 542 (e.g., Matplotlib) that produces figures in various platforms and operating systems 536. Data visualization and plotting library 542 can be embedded to visualize the waveforms that have been recorded.

While the present disclosure has been described in terms of particular embodiments and applications, in summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A computer-implemented method, comprising:
   receiving a call from a customer at a call center, the call being based on a script of a call center agent using a standard operating procedure (SOP);
   recording a sample of the call;
   extracting a Mel-Frequency Cepstral Coefficient (MFCC) from the sample;
   using a machine learning model to predict an emotion of the customer using the MFCC;
   generating a confidence score for the emotion;
   calculating a numeric value using the confidence score and an emotion value associated with the emotion;
   determining whether the numeric value exceeds an importance score at a step of the SOP;
   responsive to the numeric value not exceeding the importance score, continuing the call with the customer without a change caused by the emotion of the customer associated with the emotion value; and
   responsive to the numeric value exceeding the importance score,
   modifying the next step of the script of the call center agent and the call, wherein modifying the next step of the script comprises modifying the SOP.

2. The computer-implemented method of claim 1, wherein extracting the MFCC from the sample further comprises extracting an audio feature from the sample.

3. The computer-implemented method of claim 1, further comprising:
   training the machine learning model using an audio file database by running the machine learning model across the audio file database to identify patterns from the database that match the emotion; and
   storing the patterns for future predictions.

4. The computer-implemented method of claim 1, wherein extracting the MFCC from the sample further comprises framing the sample into short frames.

5. The computer-implemented method of claim 4, further comprising calculating a periodogram estimate of a power spectrum for each frame.

6. The computer-implemented method of claim 5, further comprising generating DCT coefficients and using the DCT coefficients in the machine learning model.

7. The computer-implemented method of claim 1, wherein modifying the next step of the script of the call center agent includes deleting a portion of the script.

8. The computer-implemented method of claim 1, wherein modifying the next step of the script of the call center agent includes substituting a portion of the script with a new script.

9. The computer-implemented method of claim 1, further comprising analyzing multiple time steps including two emotions before, one emotion before, and a current emotion.

10. The computer-implemented method of claim 1, wherein using the machine learning model to predict the emotion of the customer using the MFCC further comprises imposing a weight matrix on a sigmoid function to generate a prediction.

11. A non-transitory computer readable medium containing computer-readable instructions stored therein for causing a computer processor to perform operations comprising:
    receiving a call from a customer at a call center, the call being based on a script of a call center agent using a standard operating procedure (SOP);
    recording a sample of the call;
    extracting a Mel-Frequency Cepstral Coefficient (MFCC) from the sample;
    using a machine learning model to predict an emotion of the customer using the MFCC;
    generating a confidence score for the emotion;
    calculating a numeric value using the confidence score and an emotion value associated with the emotion;
    determining whether the numeric value exceeds an importance score at a step of the SOP;
    responsive to the numeric value not exceeding the importance score, continuing the call with the customer without a change caused by the emotion of the customer associated with the emotion value; and
    responsive to the numeric value exceeding the importance score,
    modifying the next step of the script of the call center agent and the call, wherein modifying the next step of the script comprises modifying the SOP.

12. The non-transitory computer readable medium of claim 11, wherein extracting the MFCC from the sample further comprises extracting an audio feature from the sample.

13. The non-transitory computer readable medium of claim 11, further comprising:
    training the machine learning model using an audio file database by running the machine learning model across the audio file database to identify patterns from the database that match the emotion; and
    storing the patterns for future predictions.

14. The non-transitory computer readable medium of claim 11, wherein extracting the MFCC from the sample further comprises framing the sample into short frames.

15. The non-transitory computer readable medium of claim 14, further comprising calculating a periodogram estimate of a power spectrum for each frame.

16. The non-transitory computer readable medium of claim 15, further comprising generating DCT coefficients and using the DCT coefficients in the machine learning model.

17. The non-transitory computer readable medium of claim 11, wherein modifying the next step of the script of the call center agent includes deleting a portion of the script.

18. The non-transitory computer readable medium of claim 11, wherein modifying the next step of the script of the call center agent includes substituting a portion of the script with a new script.

19. The non-transitory computer readable medium of claim 11, further comprising analyzing multiple time steps including two emotions before, one emotion before, and a current emotion.

20. The non-transitory computer readable medium of claim 11, wherein using the machine learning model to predict the emotion of the customer using the MFCC further comprises imposing a weight matrix on a sigmoid function to generate a prediction.

* * * * *